United States Patent

Sakaguchi et al.

[11] Patent Number: 6,087,456
[45] Date of Patent: Jul. 11, 2000

[54] CURABLE COMPOSITION

[75] Inventors: Masashi Sakaguchi, Kakogawa; Yoshimichi Yamanaka, Toyonaka; Makoto Chiba; Toshihiko Okamoto, both of Kobe; Yuriko Asai; Jyunji Takase, both of Akashi, all of Japan

[73] Assignee: Kaneka Corporation, Osaka, Japan

[21] Appl. No.: 08/977,741

[22] Filed: Nov. 25, 1997

[30] Foreign Application Priority Data

Nov. 25, 1996 [JP] Japan .................................. 8-313909

[51] Int. Cl.$^7$ .......................... C08L 43/04; C08L 25/02; C08F 08/42
[52] U.S. Cl. .......................... 525/342; 525/242; 525/244; 525/254; 525/319; 525/320; 525/333.7; 525/474
[58] Field of Search ...................................... 525/342, 319, 525/320, 254, 333.7, 474, 244

[56] References Cited

U.S. PATENT DOCUMENTS

| | | |
|---|---|---|
| 4,028,384 | 6/1977 | Vahlensieck . |
| 4,104,480 | 8/1978 | Thompson ............................ 174/23 C |
| 4,334,036 | 6/1982 | Yonezawa et al. ..................... 525/102 |
| 4,803,244 | 2/1989 | Umpleby ................................. 525/105 |
| 5,049,593 | 9/1991 | Marciano-Agostinelli ............. 523/173 |
| 5,530,063 | 6/1996 | Nagai et al. ............................ 525/101 |
| 5,811,483 | 9/1998 | Close ....................................... 524/500 |

FOREIGN PATENT DOCUMENTS

| | | |
|---|---|---|
| 0 320 259 A2 | 6/1989 | European Pat. Off. . |
| 0 658 575 A2 | 6/1995 | European Pat. Off. . |
| 0 709 403 A1 | 5/1996 | European Pat. Off. . |

*Primary Examiner*—Fred Zitomer
*Attorney, Agent, or Firm*—Pollock, Vande Sande & Amernick

[57] ABSTRACT

A curable composition comprising the components (A), (B), (C) and (D), viz.

(A) an isobutylene polymer which contains in a molecule, at least one alkenyl group capable of hydrosilylation reaction;

(B) a curing agent which contains at least two hydrosilyl groups in a molecule;

(C) a hydrosilylation catalyst; and (D) an organic compound which contains in a molecule, at least one alkenyl or alkynyl group capable of hydrosilylation reaction.

This composition is excellent in workability because of its low viscosity, and has such advantages that the cured product thereof has large strength and further that the weight loss by heating is small. Since a large amount of an inorganic filler can be blended with this composition, it is possible to obtain a composition having high thixotropy and little sagging.

20 Claims, No Drawings

CURABLE COMPOSITION

FIELD OF THE INVENTION

The present invention relates to a curable composition which is excellent in curability, the cured product of which is a rubber-like material and which can be cured by hydrosilylation reaction. The cured product obtained from the curable composition of the present invention has an isobutylene skeleton of a saturated hydrocarbon polymer, so that it is in particular excellent in low moisture permeability, low hydroscopicity, low gas permeability, heat resistance, weather resistance, insulating property, vibration damping property and chemical resistance. It can be widely applied in many fields such as a sealant in an electric and electronic component and the like, various coating materials, gasket materials, sealing compounds, molding materials, paints, adhesives and the like.

BACKGROUND ART

Currently, various curable liquid compositions have been developed, which can form rubber-like materials by curing. Especially, silicone rubber using hydrosilylation addition reaction as cross-linking reaction is excellent in weather resistance, heat resistance, water resistance; and further it has such characteristic properties that shape change thereof due to its curing reaction is small before and after curing, that an energy consumption is small because of quick-curing at a high temperature and that it is quite safe. This silicone rubber is used as a silicone sealing material and a potting material. However, its use is limited for such reasons that the cost of this curing system is high, its adhesion is poor, it easily gets moldy, and the like.

On the other hand, as a curing system which do not use such an expensive organopolysiloxane, Japanese Kokai Publication Hei-2-75644 and Japanese Kokai Publication Hei-3-181565 have disclosed a curable composition characterized in that a polymer having at least one alkenyl group in a molecule is cross-linked by a hydrocarbon curing agent having two hydrogen atoms bonded to silicon atom in a molecule.

Among these, the curable composition characterized in that the above-mentioned polymer comprises an isobutylene polymer of a saturated hydrocarbon is excellent in low moisture permeability, low gas permeability, chemical resistance and high vibration damping property, etc., in addition to weather resistance and heat resistance while these excellent properties can not be simultaneously realized in the above-mentioned silicone systems. Thus, wide uses thereof can be expected.

However, when this isobutylene polymer is treated as a liquid composition, it sometimes becomes necessary that the viscosity of its resin component be made low in order to blend various additives and fillers because of its high viscosity.

As general means, a non-reactive plasticizer including a process oil is used. Because these plasticizers are non-reactive, they can not be built in cross-linking, and large lowering of various characteristics such as mechanical property and heat resistance is inevitable by addition of these plasticizers. There is also the drawback that the plasticizers evaporate at a high temperature, and in particular from a point of view of heat resistance, its improvement is desired.

SUMMARY OF THE INVENTION

The present invention has for its object to accomplish a technology for making viscosity of a curable composition low, which can reduce lowering of various characteristics such as mechanical property and heat resistance, as compared with the case of using conventional plasticizers, in order to improve workability, for example, making addition of various additives and fillers easily, in a curable composition capable of being cured by hydrosilylation reaction and comprising an isobutylene polymer, which is excellent in low hydroscopicity, low moisture permeability, low gas permeability, heat resistance, weather resistance, insulating property and vibration damping property.

The inventors of the present invention have accomplished a technology for making viscosity of a curable composition low, which can reduce lowering of various characteristics such as mechanical property and heat resistance, as compared with the case of using conventional plasticizers, through using a reactive diluent that can be bonded with a curing agent by hydrosilylation reaction which is cross-linking reaction, when a isobutylene polymer is applied to a curable composition capable of curing by hydrosilylation reaction.

Thus, the present invention relates to a curable composition comprising (A) an isobutylene polymer which contains in a molecule, at least one alkenyl group capable of hydrosilylation reaction; (B) a curing agent which contains at least two hydrosilyl groups in a molecule; (C) a hydrosilylation catalyst; and (D) an organic compound which contains in a molecule, at least one alkenyl or alkynyl group capable of hydrosilylation reaction.

DETAILED DESCRIPTION OF THE INVENTION

The component (A) used in the present invention is an isobutylene polymer which contains in a molecule, at least one alkenyl group capable of hydrosilylation reaction. The isobutylene polymer herein means that monomer units constructing the polymer skeleton mainly comprise isobutylene units.

In this case, all monomer units may be isobutylene units (a), or the isobutylene polymer may contain, along with isobutylene units (a), isobutylene-copolymerizable monomer units (b) within the range of preferably less than 50% (weight %, the same hereinafter), more preferably less than 30%, and most preferably less than 20%. Thus, the total weight content of repeating units originating from isobutylene (a) is preferably not less than 50%, more preferably not less than 70%, and most preferably not less than 80% in the polymer of the component (A).

In these polymer structures, it is particularly preferable, in view of heat resistance, weather resistance and the like, that repeating units which constitute the main chain excluding the said alkenyl group consist of saturated hydrocarbons which does not contain unsaturated carbon—carbon bonds other than aromatic rings.

The polymer used as the component (A) in the invention may further contain a small quantity, preferably 10% or less based on the weight of the component (A), of other monomer units from which several double bonds may remain even after polymerization within the range for achieving the object of the invention, for example polyene such as butadiene, isoprene, 1,9-decadiene, 1,5-hexadiene and the like.

As concrete example of the copolymerizable monomer unit (b) constituting a skeleton of such an isobutylene polymer, there can be mentioned 1-butene, 2-butene, 2-methyl-1-butene, 3-methyl-1-butene, pentene, 4-methyl-1-pentene, hexene, vinylcyclohexane, methyl vinyl ether, ethyl vinyl ether, isobutyl vinyl ether, styrene, α-methylstyrene, dimethylstyrene, p-t-butoxystyrene, p-hexenyloxystyrene, p-allyloxystyrene, p-hydroxystyrene, β-pinene, indene, vinyldimethylmethoxysilane, vinyltrimethyl-silane, divinyldimethoxysilane, divinyldimethylsilane, 1,3-divinyl-1,1,3,3-tetramethyldisiloxane, trivinylmethylsilane, tetravinylsilane, allyldimethylmethoxysilane, allyltrimethylsilane, diallyldimethoxysilane, diallyldimethylsilane, γ-methacryroyloxypropyltrimethoxysilane, γ-methacryroyloxypropylmethyldimethoxysilane and the like.

The alkenyl group capable of hydrosilylation reaction in the polymer of the component (A) is not particularly limited provided that it is a group which contains carbon—carbon double bonds having activity for hydrosilylation reaction.

It is preferable that the alkenyl group capable of hydrosilylation reaction is contained at an end of the polymer of the component (A).

As the alkenyl group, there can be mentioned, for example, an aliphatic unsaturated hydrocarbon group such as vinyl, allyl, methylvinyl, propenyl, butenyl, pentenyl and hexenyl; a cyclic unsaturated hydrocarbon group such as cyclopropenyl, cyclobutenyl, cyclopentenyl, cyclohexynel; and the like. In the present invention, it is desirable that the component (A) has 1 to 10 alkenyl groups in a molecule.

The number average molecular weight of the aforementioned isobutylene polymer is preferably about 500 to 100,000 (GPC method, converted based on polystyrene), and the isobutylene polymer is especially preferably a liquid or a fluid having molecular weight of about 1,000 to 40,000 in view of easiness of handling, etc.

A method for producing the component (A) in the present invention is described in Japanese Kokai Publication Hei-8-134220.

As the curing agent of the component (B) in the invention, there is no limit in particular provided that at least two hydrosilyl groups are contained in a molecule. Herein, one hydrosilyl group shows one Si—H group. Accordingly, when two hydrogen atoms are bonded to the identical Si atom, it is reduced that there are two hydrosilyl groups.

As the component (B), organohydrogenpolysiloxane is preferable by taking into accounts simplicity of its synthesis and stability. The said organohydrogenpolysiloxane herein means a polysiloxane whose Si atoms are bonded to hydrocarbon groups or hydrogen atoms, and its concrete structure can be chain or ring as shown by, for example,

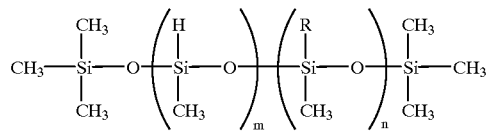

(wherein m and n satisfy the condition that 2≦m+n≦50, 2≦m, and 0≦n; and R is a hydrocarbon group with 2 to 20 carbon atoms and may contain one or more aromatic rings)

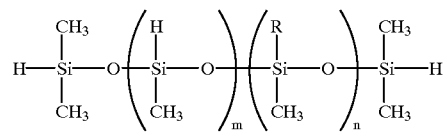

(wherein m and n satisfy the condition that 0≦m+n≦50, 0≦m, and 0≦n; and R is a hydrocarbon group with 2 to 20 carbon atoms and may contain one or more aromatic rings)

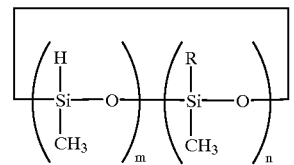

(wherein m and n satisfy the condition that 2≦m+n≦20, 2≦m≦20, and 0≦n≦18; and R is a hydrocarbon group with 2–20 carbon atoms and may contain one or more aromatic rings).

Among the above-mentioned various hydrosilyl-containing polysiloxanes, the below-described is especially preferable by taking into account the fact that compatibility of the hydrosilyl-containing curing agent of the component (B) in the invention with various organic polymers such as the component (A) may hardly be reduced.

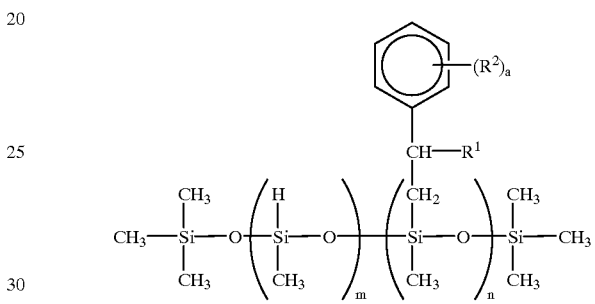

(wherein m and n satisfy the condition that 2≦m+n≦50, 2≦m, and 0≦n, $R^1$ represents a hydrogen atom or methyl, $R^2$ represents an alkyl group with 1–4 carbon atoms and plural $R^2$s may be the same or different. a is 0 or an integer of 1 to 5)

The number of these hydrosilyl groups contained in the component (B) can be at least two in a molecule, but 2 to 40 are preferable. If it is less than 2 when the composition of the present invention is subjected to cure by using hydrosilylation reaction, the curing reaction progresses slowly and the product may often be cured insufficiently. Conversely, if it exceeds 40, stability of the curing agent of the component (B) is reduced, and further reactivity of the hydrosilyl groups become lower and the unreacted hydrosilyl groups remain in the cured products, thus causing generation of voids and cracks.

The curing agent of the component (B) is used in an amount of 0.5 to 1,000 parts by weight, preferably 0.5 to 100 parts by weight, more preferably 1 to 50 parts by weight, relative to 100 parts by weight of the component (A).

As the hydrosilylation catalyst of the component (C) of the invention, there are no special limits and an arbitrary hydrosilylation catalyst can be used.

A concrete example thereof can be given by a chloroplatinic acid, a simple body of platinum or a solid platinum supported on a carrier such as alumina, silica, carbon black and the like;

platinum-vinylcyloxane complex (e.g.
 $Pt_n(ViMe_2SiOSiMe_2Vi)_n$
 $Pt[(MeViSiO)_4]_m);$ platinum-phosphine complex (e.g.
 $Pt(PPh_3)_4$, $Pt(PBu_3)_4);$ platinum-phospite complex (e.g.
 $Pt[P(OPh)_3]_4$, $Pt[P(OBu)_3]_4)$ (wherein Me represents methyl, Bu represents butyl, Vi represents vinyl and Ph represents phenyl, and each of n and m is an integer); Pt(acac)$_2$; platinum-hydrocarbon complex described in the specification of U.S. Pat. No. 3,159,601 and No. 3,159,662 by Ashby; and platinum-alcoholate catalyst described in the specification of U.S. Pat. No. 3,220,972 by Lamoreaux.

Besides, as examples of the catalyst other than platinum compounds, there can be mentioned RhCl(PPh$_3$)$_3$, RhCl$_3$, Rh/Al$_2$O$_3$, RuCl$_3$, IrCl$_3$, FeCl$_3$, AlCl$_3$, PdCl$_2$·2H$_2$O, NiCl$_2$, TiCl$_4$ or the like.

These catalysts can be used alone or in combination. In view of catalytic activity, chloroplatinic acid, platinum-olefin complex, platinum-vinylsiloxane complex, Pt(acac)$_2$, and the like are preferable.

There are no special limits on an amount of the catalyst (c), but it can be used in an amount of $10^{-1}$ to $10^{-8}$ mole relative to one mole of the alkenyl group contained in the component (A). More preferable range is $10^{-2}$ to $-10^{-6}$ mole. The hydrosilylation catalysts are generally expensive and corrosive, and a large quantity of hydrogen gas may often generate to foam the cured product, so that it is not preferable that more than $10^{-1}$ mole of this catalyst is used.

The component (D) of the present invention, the organic compound which contains in a molecule, at least one alkenyl or alkynyl group capable of hydrosilylation reaction, is a compound which lower viscosity of the said composition and which can be bonded to Si—H groups contained in the curing agent of the component (B) by hydrosilylation reaction to thereby be taken in the cured product through chemical bonds. Therefore, there are no limits on these organic compounds provided that they are a low-molecule-weight organic compound having in a molecule, at least one alkenyl or alkynyl group capable of hydrosilylation reaction, but they are desirable to be a hydrocarbon compound having low polarity in view of excellent compatibility with the component (A) of the invention. The molecular weight thereof is preferably 400 or less.

In view of heat resistance, weather resistance and the like which are characteristic of the composition according to the invention, the component (D) is more preferably a hydrocarbon compound having substantially no carbon—carbon unsaturated bonds which have low activity for hydrosilylation reaction, other than aromatic rings.

Moreover, a hydrocarbon compound with 8 and more carbon atoms is most preferable because a compound having a low boiling point capable of evaporating during curing and aging can have some problems in the shape change before and after curing and in an environmental side.

As a concrete example of the component (D), α-olefin having 6 to 20 carbon atoms, more preferably 8 to 20 carbon atoms, α,ω-diene having 8 to 20 carbon atoms, α-methylstyrene, styrene, divinylbenzene, bisphenol aryl ether or the like can be given, but it is not limited to these examples. Among these, α-olefin having 8 to 20 carbon atoms are most preferable.

When the above-mentioned components (D) are used, it is better to pay the following attentions. The mechanical property of the cured product obtained from the composition of the invention strongly depends on the number of functional groups contained in the component (D). As the number of the contained alkenyl or alkynyl groups increases, modulus of the cured product becomes high and elongation of the cured product becomes small. When low modulus and high elongation are demanded, it is desirable to select a compound containing only one alkenyl or alkynyl group in a molecule as the component (D). Besides, the mechanical property thereof are also strongly controlled by addition level of the component (D).

On the other hand, there are no special limits in addition level of the component (D), provided that it does not prevent formation of a three-dimensional crosslinked structure by the hydrosilylation reaction of the isobutylene polymer of the component (A) with the curing agent of the component (B). When the component (D) is excessively added, the SiH groups of the component (B) may be consumed by hydrosilylation reaction with the unsaturated groups of the component (D), thus causing the formation of the three-dimensional crosslinked structure of the component (A) to be insufficient.

The organic compound of the component (D) is preferably used in an amount of 0.1 to 100 parts by weight, more preferably 0.5 to 70 parts by weight, and most preferably 1 to 50 parts by weight, relative to 100 parts by weight of the component (A).

Various inorganic fillers can further be added to the curable composition of the invention according to a purpose thereof. Since the component (D) becomes nonvolatile by being bonded to the polymer, a compound having low molecular weight and low viscosity can be used as the component (D). When the component (D) having low viscosity is used, a larger amount of the inorganic filler can be added, compared with the case when a plasticizer having high viscosity is used, to obtain a composition having high thixotropy and low sagging property.

As the inorganic filler, a general inorganic filler such as calcium carbonate, talc, silica, carbon black etc. can be used. However, since the curable composition of the invention is cured by utilizing hydrosilylation reaction, when the inorganic filler is used, it must be taken into account possibility of inhibition to hydrosilylation reaction, for example, possibility that side reactions may happen during the curing reaction if much water is contained in the composition.

In addition, a storage stability-improving agent can be used in order to improve storage stability of the curable composition of the present invention.

As the storage stability-improving agent, a general stabilizer known as a storage stabilizer for the component (B) of the invention can be used, and there are no special limits provided that expected purposes are achieved.

As concrete examples, a compound containing aliphatic unsaturated bonds, an organophosphorus compound, an organosulfur compound, a nitrogen-containing compound, a tin compound, an organoperoxide or the like can be suitably used.

As more concrete examples, there can be mentioed 2-benzothiazolylsufide, benzothiazole, thiazole, dimethylacetylenedicarboxylate, diethylacetylenedicarboxylate, BHT, butylhydroxyanisole, vitamin E, 2-(4-morpholozynyldithio)benzothiazole, 3-methyl-1-butene-3-ol, organosiloxane containing acetylenically unsaturated groups, acetylene alcohol, 3-methyl-1-butyl-3-ol, diallyl fumalate, diallyl malate, diethyl malate, diethyl malate, dimethtl malate, 2-pentenenitrile, 2,3-dichloropropene and the like. Among them, thiazole and benzothiazole are specially preferable in view of compatibility of pot life with quick-curing, but they are not limited to these examples.

Additionally, to the curable compound of the invention can appropriately be added other fillers, antioxidants, ultraviolet absorbents, pigments, surfactants and the like, if necessary. As a concrete example of these fillers, titanium oxide, hydrozincite, barium sulfate and the like can be given.

In the curable composition capable of being cured by hydrosilylation reaction using an isobutylene polymer which is excellent in low moisture permeability, low hydroscopicity, low gas permeability, heat resistance, weather resistance, insulating property and vibration damping property, the organic compound which can be bonded to the curing agent by the aforementioned hydrosilylation reaction is used instead of conventional plasticizers used for technologies for lowering viscosity, thus making it possible to prevent lowering various characteristics resulting from use of conventional plasticizers.

In the composition of the present invention, the compound containing an alkenyl or alkynyl group is used as a reactive diluent instead of conventional non-reactive plasticizers such as paraffinic process oil. Thus, the composition of the invention is excellent in workability because of its low viscosity, and it has such advantages that the cured product thereof has large strength and further that the weight loss by heating is small. Since a large amount of an inorganic filler can be blended with the composition of the invention, it is possible to obtain a composition having high thixotropy and little sagging. The cured product obtained from the composition of the invention is an elastomer excellent in various characteristics such as low moisture permeability, low hygroscopicity, low gas permeability, heat resistance, weather resistance, insulating property and vibration damping property, and particularly it is improved in heat resistance compared with the case of using conventional non-reactive plasticizers.

BEST MODE FOR CARRYING OUT THE INVENTION

The following examples are further illustrative of the present invention but are by no means limitative of the scope of the invention.

EXAMPLE 1

As the component (A), A1 (analytical values of which are shown in Table 1) selected from A (A1 and A2) was used. It was synthesized by the method mentioned in Japanese Kokai Publication Hei-08-134220 and its structure is shown below.

TABLE 1

| Analysis item | Measurement method | Measured value; Compound | |
|---|---|---|---|
| | | A1 | A2 |
| Number average molecular weight (Mn) | GPC | 5,400 | 10,600 |
| Weight average molecular weight (Mw) | GPC | 7,200 | 12,400 |
| Degree of dispersion | GPC | 1.3 | 1.2 |
| Number of terminal functional groups | $^1$H-NMR | 2.0 | 1.9 |

Note 1) The measured value by GPC is converted on a polystyrene weight basis.
Note 2) The number of terminal functional groups by $^1$H-NMR measurement shows the number of terminal functional groups relative to the residues of initiator.

Compound A:

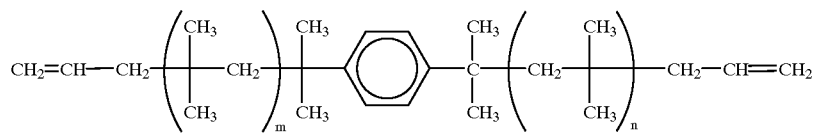

(wherein each of m and n represents an integer.)

At first, 10 parts by weight of octadecene as the component (D) (made by Wako Pure Chemicals Co., Ltd.) was mixed with 100 parts by weight of the component (A), and the viscosity of the mixture was measured with E type viscometer.

Then, one part by weight of Irganox 1010 (made by Chiba-Gaigi) as an antioxidant relative to 100 parts by weight of the component (A) of this mixture was weighed, and was mixed and kneaded three times with a roll. Following this, the compound B of the component (B), the structure of which is shown below, Compound B:

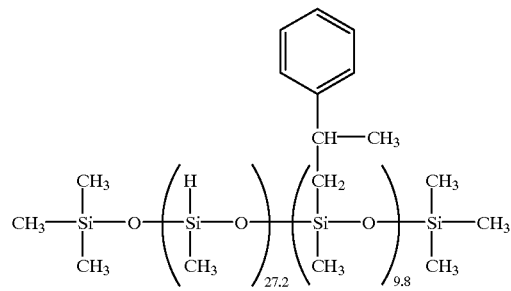

was weighed in such an amount that a mole ratio of alkenyl groups of the component (A) to Si—H groups of the component (B) is 1:4, and mixed with this mixture. Furthermore, 3 mole of dimethyl maleate as a storage stability-improving agent was weighed relative to one mole of platinum, and bis(1,3-divinyl-1,1,3,3-tetramethyldisiloxane)-platinum complex catalyst ($8.3\times10^{-5}$ mmol/μl, xylene solution) as the component (C) were weighed in such an amount that platinum in the complex is $5\times10^{-4}$ molar per mole of alkenyl groups in the component (A), and then mixed uniformly. The composition was poured in a die of 10 cm×10 cm and was subjected to cure under a pressure of about 1 MPa at 130° C. for 30 minutes. A sheet of the cured product thus obtained was punched in a dumbbell type. Its elongating property was measured (the measurement was in accordance with JIS K 6301).

EXAMPLE 2

Example 1 was repeated except that 20 parts by weight of the component (D) was added relative to 100 parts by weight of the component (A). Its viscosity and elongating property of the dumbbell were measured.

EXAMPLE 3

Example 1 was repeated except that 40 parts by weight of the component (D) was added relative to 100 parts by weight of the component (A) and that the component (B) was added in such an amount that a molar ratio of alkenyl groups in the component (A) to Si—H groups in the component (B) is 1:8. Its viscosity and elongating property of the dumbbell were measured.

COMPARATIVE EXAMPLE 1

Example 1 was repeated except that 25 parts by weight of paraffinic process oil (made by Idemitsu Petro. Co.: trade name, PS-32) was added relative to 100 parts by weight of the component (A) as a plasticizer instead of the component (D). Its viscosity was measured. In preparing a specimen, a compound C, the structure of which is shown below, was used as the component (B) in such an amount that a molar ratio of alkenyl groups in the component (A) to Si—H groups in the component (B) is 1:2.

Compound C:

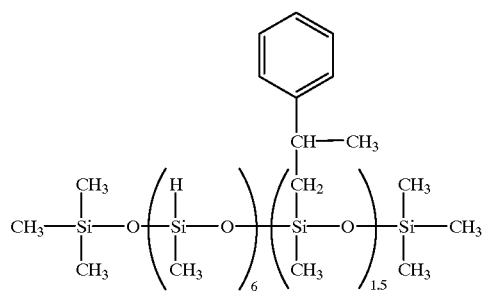

COMPARATIVE EXAMPLE 2

Comparative Example 1 was repeated except that 50 parts by weight of paraffinic process oil (made by Idemitsu Petro. Co.: trade name, PS-32) was added relative to 100 parts by weight of the component (A) as a plasticizer instead of the component (D). Its viscosity and elongating property were measured.

COMPARATIVE EXAMPLE 3

Comparative Example 1 was repeated except that 100 parts by weight of paraffinic process oil (made by Idemitsu Petro. Co.: trade name, PS-32) was added relative to 100 parts by weight of the component (A) as a plasticizer instead of the component (D). Its viscosity and elongating property were measured.

EXAMPLE 4

Example 1 was repeated except that the compound A2 was used as the component (A). Its viscosity and elongating property of the dumbbell were measured.

EXAMPLE 5

Example 1 was repeated except that the compound A2 was used as the component (A); 20 parts by weight of the component (D) was added relative to 100 parts by weight of the component (A); and that the component (B) was added in such an amount that a molar ratio of alkenyl groups in the component (A) to Si—H groups in the component (B) is 1:6. Its viscosity and elongating property of the dumbbell were measured.

COMPARATIVE EXAMPLE 4

Comparative Example 1 was repeated except that A2 was used as the component (A). Its viscosity and elongating property of the dumbbell were measured.

COMPARATIVE EXAMPLE 5

Comparative Example 2 was repeated except that A2 was used as the component (A). Its viscosity and elongating property of the dumbbell were measured.

Each blended ratio is shown in Table 2.

TABLE 2

|  |  |  | Example | | | Comparative Example | | | Example | | Comparative Example | |
| --- | --- | --- | --- | --- | --- | --- | --- | --- | --- | --- | --- | --- |
|  |  |  | 1 | 2 | 3 | 1 | 2 | 3 | 4 | 5 | 4 | 5 |
| Component (A) | Compound A1 | g | 100 | 100 | 100 | 100 | 100 | 100 |  |  |  |  |
|  | Compound A2 | g |  |  |  |  |  |  | 100 | 100 | 100 | 100 |
| Component (D) | Octadecene | g | 10 | 20 | 40 |  |  |  | 10 | 20 |  |  |
| Plasticizer | PS-32 | g |  |  |  | 25 | 50 | 100 |  |  | 25 | 50 |
| Component (B) | Compound B | g | 19 | 19 | 38 |  |  |  | 9 | 17 |  |  |
|  | Compound C | g |  |  |  | 9 | 9 | 9 |  |  | 4 | 4 |
| Component (C) | Pt-vinylsiloxane complex | μl | 220 | 220 | 220 | 220 | 220 | 220 | 107 | 107 | 107 | 107 |
| Storage stability-improving agent | Dimethyl maleate | mg | 80 | 80 | 80 | 80 | 80 | 80 | 36 | 36 | 36 | 36 |
| Antioxidant | Irganox 1010 | g | 1 | 1 | 1 | 1 | 1 | 1 | 1 | 1 | 1 | 1 |

EXAMPLE 6

The above-mentioned compound A1 was used as the component (A), and 10 parts by weight of octadecene (made by Wako Pure Chemicals Co.,Ltd.) as the component (D). One part by weight of Irganox 1010 as the antioxidant (made by Chiba-Gaigi) and 50 parts by weight of talc as the inorganic filler (Japan talc, trade name, MS) were weighed relative to 100 parts by weight of the component (A) and kneaded three times with a roll. The viscosity of the mixture was measured with BS type viscometer. Following this, the compound B of the component (B), the structure of which is shown above, was weighed in such an amount that a molar ratio of alkenyl groups of the component (A) to Si—H groups of the component (B) is 1:4 and mixed with this mixture. In addition, 3 mole of dimethyl maleate as a storage stability-improving agent was weighed relative to one mole of platinum, and bis(1,3-divinyl-1,1,3,3-tetramethyldisiloxane)-platinum complex catalyst (8.3×10$^{-5}$ mmol/μl, xylene solution) as the component (C) were weighed in such an amount that platinum in the complex is $5 \times 10^{-4}$ mole per mole of alkenyl groups in the component (A), and then mixed uniformly. The composition was poured in a die of 10 cm×10 cm and was subjected to cure under a pressure of about 1 MPa at 130° C. for 30 minutes. A sheet of the cured product thus obtained was punched in a dumbbell type. Its elongating property was measured (the measurement was in accordance with JIS K6301).

EXAMPLE 7

Example 6 was repeated except that 20 parts by weight of the component (D) was added relative to 100 parts by weight of the component (A). Its viscosity and elongating property of the dumbbell were measured.

|  |  |  | Example | | Comparative Example | |
|---|---|---|---|---|---|---|
|  |  |  | 6 | 7 | 6 | 7 |
| Component (A) | Compound A1 | g | 100 | 100 | 100 | 100 |
| Component (D) | Octadecene | g | 10 | 20 |  |  |
| Plasticizer | PS-32 | g |  |  | 25 | 50 |
| Inorganic filler | Talc MS | g | 50 | 50 | 50 | 50 |
| Component (B) | Compound B | g | 19 | 19 |  |  |
|  | Compound C |  |  |  | 10 | 10 |
| Component (C) | Pt-vinylsiloxane complex | μl | 223 | 223 | 223 | 223 |
| Storage stability-improving agent | Dimethyl maleate | mg | 80 | 80 | 80 | 80 |
| Antioxidant | Irganox 1010 | g | 1 | 1 | 1 | 1 |

The results of the above-mentioned measurements are shown in Table 4.

EXAMPLE 8

In order to examine heat resistance of the cured product obtained by the present invention, each of sample pieces of the cured products which were prepared in the above-mentioned Examples 6 and 7 and Comparative Examples 6 and 7 was allowed to stand at 150° C. for about 30 days. Its weight change was then measured.

The results are shown in Table 5.

TABLE 5

|  |  | Example | | Comparative Example | |
|---|---|---|---|---|---|
|  |  | 6 | 7 | 6 | 7 |
| Weight loss | (%) | <1 | <1 | 13 | 23 |

It is clear from the results shown in Tables 4 and 5 that the compound using the reactive diluent of the present invention can reveal, at the same viscosity, higher strength concerning compatibility with the said saturated hydrocarbon and revealed strength, as compared with compounds using conventional plasticizers. Moreover, in a heat-resistant test, little weight loss by heating is observed in the compound using the reactive diluent of the present invention, as compared with the compounds using conventional plasticizers which evaporate slowly at 150° C., so that it can be confirmed the compound of the present invention shows excellent heat resisitance.

What is claimed is:

1. A curable composition comprising:
   (A) an isobutylene polymer which contains per molecule, at least one alkenyl group for reacting with a hydrosilyl group;
   (B) a curing agent which contains at least two hydrosilyl groups per molecule;
   (C) a hydrosilylation catalyst; and
   (D) a hydrocarbon compound having 6 to 20 carbon atoms which contains per molecule, at least one alkenyl or alkynyl group reaction for reacting with a hydrosilyl group.

2. The curable composition according to claim 1, wherein the alkenyl group for reacting with a hydrosilyl group is located at an end of the isobutylene polymer.

3. The curable composition according to claim 1, wherein the total weight content of repeating units originating from isobutylene is not less than 50% of the isobutylene polymer.

4. The curable composition according to claim 1, wherein the total weight content of repeating units originating from isobutylene is not less than 80% of the isobutylene polymer.

|  |  | Example | | | Comparative Example | | | Example | | Comparative Example | |
|---|---|---|---|---|---|---|---|---|---|---|---|
|  |  | 1 | 2 | 3 | 1 | 2 | 3 | 4 | 5 | 4 | 5 |
| Viscosity | Pa · S | 105 | 26 | 4 | 92 | 27 | 6 | 253 | 66 | 231 | 61 |
| M50 | MPa | 0.5 | 0.4 | 0.2 | 0.4 | 0.3 | 0.2 | 0.3 | 0.2 | 0.2 | 0.2 |
| M100 | MPa | — | — | — | — | — | — | 0.5 | 0.4 | 0.3 | 0.3 |
| Tmax | MPa | 0.5 | 0.6 | 0.4 | 0.6 | 0.4 | 0.2 | 0.8 | 0.7 | 0.5 | 0.4 |
| Emax | % | 85 | 85 | 97 | 90 | 81 | 67 | 179 | 216 | 185 | 157 |

|  |  | Example | | Comparative Example | |
|---|---|---|---|---|---|
|  |  | 6 | 7 | 6 | 7 |
| Viscosity (2 rpm) | Pa · S | 740 | 170 | 420 | 90 |
| Viscosity (10 rpm) | Pa · S | 450 | 100 | 320 | 70 |
| Ratio of viscosity (2 rpm/10 rpm) |  | 1.6 | 1.7 | 1.3 | 1.3 |
| M50 | MPa | 2.2 | 1.4 | 1.5 | 0.9 |
| Tmax | MPa | 2.6 | 1.8 | 2.0 | 1.1 |
| Emax | % | 69 | 68 | 75 | 67 |

5. The curable composition according to claim 1, wherein the curing agent is an organohydrogenpolysiloxane which contains at least two hydrosilyl group per molecule.

6. The curable composition according to claim 1, wherein the molecular weight of the organic compound (D) is 400 or less.

7. The curable composition as claimed in claim 1, wherein the organic compound (D) is α-olefin having 6 to 20 carbon atoms.

8. The curable composition according to claim 2, wherein the total weight content of repeating units originating from isobutylene is not less than 50% of the isobutylene polymer.

9. The curable composition according to claim 2, wherein the total weight content of repeating units originating from isobutylene is not less than 80% of the isobutylene polymer.

10. The curable composition according to claim 2, wherein the curing agent is an organohydrogenpolysiloxane which contains at least two hydrosilyl groups per molecule.

11. The curable composition according to claim 3, wherein the curing agent is organohydrogenpolysiloxane which contains at least two hydrosilyl groups per molecule.

12. The curable composition according to claim 2, wherein the molecular weight of the organic compound (D) is 400 or less.

13. The curable composition according to claim 3, wherein the molecular weight of the organic compound (D) is 400 or less.

14. The curable composition according to claim 4, wherein the molecular weight of the organic compound (D) is 400 or less.

15. The curable composition according to claim 5, wherein the molecular weight of the organic compound (D) is 400 or less.

16. The curable composition as claimed in claim 2, wherein the organic compound (D) is α-olefin having 6 to 20 carbon atoms.

17. The curable composition as claimed in claim 3, wherein the organic compound (D) is α-olefin having 6 to 20 carbon atoms.

18. The curable composition as claimed in claim 4, wherein the organic compound (D) is α-olefin having 6 to 20 carbon atoms.

19. The curable composition as claimed in claim 5, wherein the organic compound (D) is α-olefin having 6 to 20 carbon atoms.

20. The curable composition as claimed in claim 6, wherein the organic compound (D) is α-olefin having 6 to 20 carbon atoms.

* * * * *